US012198917B2

(12) United States Patent
Satoh

(10) Patent No.: US 12,198,917 B2
(45) Date of Patent: Jan. 14, 2025

(54) MASS SPECTRUM PROCESSING DEVICE AND MASS SPECTRUM PROCESSING METHOD

(71) Applicant: JEOL Ltd., Tokyo (JP)

(72) Inventor: Takaya Satoh, Tokyo (JP)

(73) Assignee: JOEL Ltd., Tokyo (JP)

( * ) Notice: Subject to any disclaimer, the term of this patent is extended or adjusted under 35 U.S.C. 154(b) by 427 days.

(21) Appl. No.: 17/843,221

(22) Filed: Jun. 17, 2022

(65) Prior Publication Data

US 2022/0406585 A1 Dec. 22, 2022

(30) Foreign Application Priority Data

Jun. 18, 2021 (JP) ................................ 2021-101754

(51) Int. Cl.
*H01J 49/00* (2006.01)

(52) U.S. Cl.
CPC ...... *H01J 49/0036* (2013.01); *H01J 49/0009* (2013.01)

(58) Field of Classification Search
CPC .......................... H01J 49/0036; H01J 49/0009
USPC ................................................. 250/281, 282
See application file for complete search history.

(56) References Cited

U.S. PATENT DOCUMENTS

2019/0096646 A1 3/2019 Kubo
2019/0228956 A1 7/2019 Satoh
2021/0065849 A1* 3/2021 Uematsu ................ G16C 20/20
2022/0122825 A1* 4/2022 Satoh .................. H01J 49/0031

FOREIGN PATENT DOCUMENTS

JP 201790228 A 5/2017
JP 201844803 A 3/2018
JP 201844810 A 3/2018
JP 201935719 A 3/2019
JP 2019128188 A 8/2019
JP 20208314 A 1/2020
JP 202132808 A 3/2021

OTHER PUBLICATIONS

Office Action issued in JP2021101754 on Jul. 18, 2023.
Extended European Search Report issued in EP22178480.4 on Oct. 31, 2022.

(Continued)

*Primary Examiner* — Michael Maskell
(74) *Attorney, Agent, or Firm* — The Webb Law Firm

(57) ABSTRACT

Peak determination is executed with respect to the mass spectrum of a sample to generate a peak list. For each of the plurality of peaks contained in the peak list, a Kendrick mass (KM) of a designated monomer is calculated. An RKM is calculated, the RKM being a fractional part of a value obtained by dividing the KM by the integer mass of the monomer, or a remainder of dividing a nominal Kendrick mass (NKM) by the integer mass of the monomer. A plurality of peaks contained in the peak list and satisfying a grouping condition, including the permissible range of the RKM of the starting point peak, are grouped.

13 Claims, 9 Drawing Sheets

(56) References Cited

OTHER PUBLICATIONS

Fouquet et al., First Gut Instincts are Always Right: The Resolution Required for a Mass Defect Analysis of Polymer ons Can Be as Low as Oligomeric, Analytical Chemistry, 2018, vol. 90, pp. 2404-2408.
Ishitsuka et al. An arsenal of tools based on Kendrick mass defects to process congested electrospray ionization high-resolution mass spectra of polymers with multiple charging, Rapid Communications in Mass Spectrometry, 2019, vol. 34, pp. 1-3.
Fouquet, Thierry N.J., The Kendrick analysis for polymer mass spectrometry, Journal of Mass Spectrometry, 2019, vol. 54, pp. 933-947.
Fouquet et al., On the Kendrick Mass Defect Plots of Multiply Charged Polymer lons: Splits, Misalignments, and How to Correct Them, Journal of the American Society for Mass Spectrometry, 2018, vol. 29, pp. 1611-1626.

* cited by examiner

| No. | m/z | IONIC STRENGTH |
|---|---|---|
| 1 | ***** | ***** |
| 2 | ***** | ***** |
| 3 | ***** | ***** |
| 4 | ***** | ***** |
| ⋮ | ⋮ | ⋮ |
| ***** | ***** | ***** |
| ***** | ***** | ***** |
| ***** | ***** | ***** |
| ⋮ | ⋮ | ⋮ |

FIG. 9

| No. | m/z | IONIC STRENGTH |
|---|---|---|
| 1 | ***** | ***** |
| 2 | ***** | ***** |
| 3 | ***** | ***** |
| 4 | ***** | ***** |
| ⋮ | ⋮ | ⋮ |
| ***** | ***** | ***** |
| ***** | ***** | ***** |
| ***** | ***** | ***** |
| ⋮ | ⋮ | ⋮ |

RED

BLUE

FIG. 10

MASS SPECTRUM PROCESSING DEVICE AND MASS SPECTRUM PROCESSING METHOD

CROSS REFERENCE TO RELATED APPLICATION

This application claims priority to Japanese Patent Application No. 2021-101754 filed on Jun. 18, 2021, the disclosure of which is hereby incorporated by reference in its entirety.

BACKGROUND OF THE INVENTION

Field of the Invention

The present disclosure relates to a mass spectrum processing device and a mass spectrum processing method.

Description of Related Art

A mass spectrometer system generally includes a mass spectrometer device and an information processing device. A mass spectrometer device is a device for measuring mass spectra. An information processing device functions as a mass spectrum processing device. In mass spectrometry, a mass m is expressed using a unit system in which the mass of $^{12}C$ is defined as 12 u.

In the case where a target sample for mass spectrometry is a polymer, the mass spectrum of the sample contains a plurality of peaks in accordance with a plurality of degrees of polymerization. Polymers that are different from each other only in the degree of polymerization, or a plurality of polymers, are referred to as a polymer series.

Note that a known example of a method for analyzing a mass spectrum obtained from a sample containing a plurality of polymers is Kendrick Mass Defect (KMD) Analysis or the like. JP2020-8314A and JP2019-128188A describe calculation of an index of a mass spectral component, using the KMD Analysis. JP2017-90228A describes three dimensional display of a value obtained using the KMD Analysis.

SUMMARY OF THE INVENTION

An object of the present disclosure is to enable ready specification of the same polymer series, based on the mass spectra of polymers.

According to one aspect of the present disclosure, there is provided a mass spectrum processing device, including a list generating unit for executing peak determination with respect to the mass spectrum of a sample containing a synthetic polymer to generate a peak list; an analyzing unit for calculating a Kendrick mass (KM) of a designated monomer for each of a plurality of peaks contained in the peak list to calculate an RKM, the RKM being the fractional part of a value obtained by dividing the KM by the integer mass of the monomer or the remainder of dividing a nominal Kendrick mass (NKM) by the integer mass of the monomer; and a grouping unit for grouping a plurality of peaks that are contained in the peak list and satisfy a grouping condition, the grouping condition including a permissible range of the RKM of a starting point peak.

In an embodiment, the analyzing unit may further calculate a Kendrick mass defect (KMD) of the monomer for each of the plurality of peaks contained in the peak list, and the grouping unit may group a plurality of peaks that are contained in the peak list and satisfy a grouping condition, the grouping condition including a permissible range of the KMD of the starting point peak and the permissible range of the RKM of the starting point peak.

In an embodiment, the analyzing unit may plot the plurality of peaks contained in the peak list as a plurality of peak points in a coordinate system defined by two axes representing the RKM and the NKM, respectively, the NKM being the integer portion of the KM, to thereby generate an NKM-RKM plot, and the NKM-RKM plot may be displayed on a display.

In an embodiment, the analyzing unit may plot the plurality of peaks contained in the peak list as a plurality of peak points in a coordinate system defined by two axes representing the KMD and the NKM, respectively, the NKM being the integer portion of the KM, to thereby generate a KMD plot, and plots the plurality of peaks contained in the peak list as a plurality of peak points in a coordinate system defined by two axes representing the KMD and the RKM, to thereby generate an RKM-KMD plot, and the KMD plot and the RKM-KMD plot may be displayed on a display.

In an embodiment, the grouping unit may generate a display peak list, based on the peak list, such that peaks contained in the respective groups are shown in respective different colors for every group in the display peak list.

In an embodiment, the mass spectrum processing device may further include an index calculation unit for calculating a polymer index of each group for every group, based on the ionic strength of the respective peaks contained in the group.

In an embodiment, the analyzing unit may delete the grouped peaks from the peak list, and executes grouping with respect to a peak list subjected to deletion, and the analyzing unit may repeat the deletion and grouping to thereby make a plurality of groups.

In an embodiment, the permissible range of the KMD of the starting point peak may become larger, depending on a molecular weight.

In an embodiment, the starting point peak may be a monoisotopic peak, and the grouping unit may make the permissible range of the RKM larger as the molecular weight becomes larger.

In an embodiment, the starting point peak may be a peak having a maximum ionic strength among isotopic peaks of the sample, and the grouping unit may make the permissible range of the RKM larger as the molecular weight becomes larger.

In an embodiment, the grouping unit may determine whether the grouped peaks are peaks attributed to a polymer, referring to the lower limit of the number of grouped peaks.

According to another aspect of the present disclosure, there is provided a mass spectrum processing method including the steps of executing peak determination with respect to the mass spectrum of a sample containing a synthetic polymer to generate a peak list; calculating a Kendrick mass (KM) of a designated monomer for each of a plurality of peaks contained in the peak list to calculate an RKM, the RKM being the fractional part of a value obtained by dividing the KM by the integer mass of the monomer or the remainder of dividing a nominal Kendrick mass (NKM) by the integer mass of the monomer; and grouping a plurality of peaks that are contained in the peak list and satisfy a grouping condition, the grouping condition including a permissible range of the RKM of a starting point peak.

In an embodiment, the mass spectrum processing method may further include the steps of calculating a Kendrick mass defect (KMD) of the monomer for each of the plurality of peaks contained in the peak list, and grouping a plurality of peaks that are contained in the peak list and satisfy a grouping condition, the grouping condition including a permissible range of the KMD of the starting point peak and the permissible range of the RKM of the starting point peak.

According to the present disclosure, the same polymer series can be readily specified, based on the mass spectra of polymers.

BRIEF DESCRIPTION OF THE DRAWINGS

Embodiment(s) of the present disclosure will be described based on the following figures, wherein:

FIG. 9 illustrates one example of a peak list;

FIG. 10 illustrates one example of a display peak list;

DESCRIPTION OF THE INVENTION

Embodiments of the present disclosure will now be described.

Mass Spectrometry of Polymers

A polymer has a structure including repeating monomer units. Thus, the mass of a polymer is characterized mainly by the number of monomers (that is, the degree of polymerization) and the mass of both end groups. A mass spectrometer system may use a cationization agent for ionization. Thus, the mass of a polymer observed in a mass spectrum is generally expressed as Expression (1) below.

$$(\text{mass of polymer})=(\text{mass of monomer})\times(\text{degree of polymerization})+(\text{mass of end group})+(\text{mass of cationization agent}) \quad (1)$$

Figure 1:
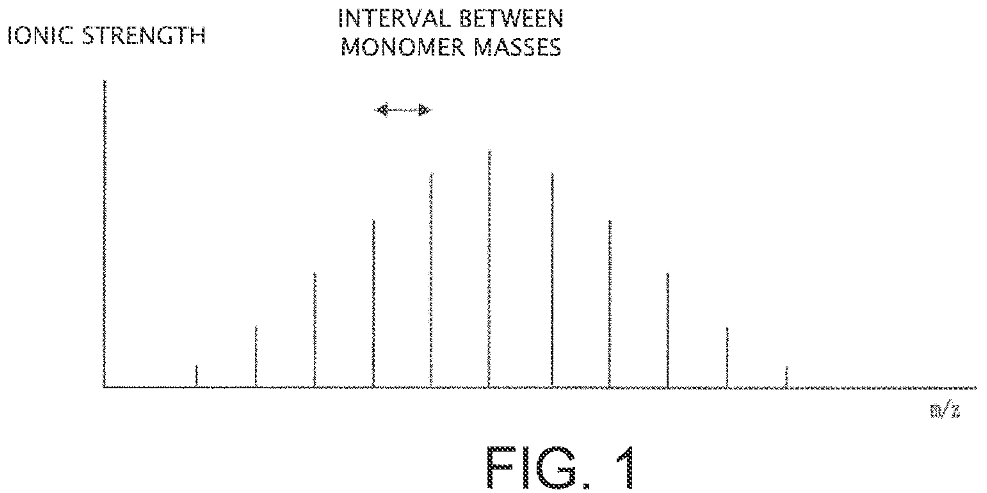
FIG. 1 illustrates one example of a mass spectrum.

As polymers containing the same monomer may be different from each other in degree of polymerization, peaks are formed corresponding to the respective masses of the monomers, in other words, formed at intervals between the masses of monomers, as illustrated in FIG. 1. The ionic strength has a distribution in accordance with the degree of polymerization. FIG. 1 illustrates an exemplary mass spectrum, in which the abscissa represents a value (m/z) obtained by dividing the mass of an ion by a valence, and the ordinate represents an ionic strength.

An advantage of mass spectrometry in polymer analysis lies in that different polymer series can be identified based on the difference in the masses of monomers and the masses of end groups.

In addition, a polymer index value, representing the distribution of a polymer, may be calculated for an identified polymer series. Examples of a polymer index value include a number-average molecular weight, a weight-average molecular weight, a polydispersity, or the like.

KMD Analysis and RKM Analysis

The Kendrick Mass Defect Analysis (hereinafter referred to as "the KMD Analysis") is a method for visualizing the peaks appearing at the same intervals on a mass spectrum of a polymer having a repeating structure, in the form of a drawing referred to as a KMD plot. The abscissa of a KMD plot represents values relevant to the integer component of a mass, while the ordinate represents values relevant to the fractional part of the mass. As a value relevant to a fractional part needs to be plotted, the accuracy of a mass is important. Hence, the KMD Analysis uses data obtained using a Fourier-transform mass spectrometer or a Time-of-Flight mass spectrometer (for example, a device for measuring a time of flight over 10 m).

A Kendrick mass (hereinafter referred to as a "KM") is calculated for a polymer, using Expression (2) below.

$$KM=M\times Mri/Mr \quad (2)$$

In the above, M is the mass of a polymer; Mri is the integer mass of a monomer unit; Mr is the accurate mass of the monomer unit. These are generally designated by a user.

The integer portion of the above-mentioned Kendrick mass KM is denoted as an "NKM", and the difference between a KM and an NKM is referred to as a Kendrick mass defect (KMD).

The mass An of a polymer series A (a plurality of polymers different only in degree of polymerization) is generally expressed as Expression (3) below.

$$An=Mr\times n+Me+Mc \quad (3)$$

In the above, n is the degree of polymerization (integer); Me is the mass of an end group; Mc is the mass of a cationization agent. Substitution of An expressed as Expression (3) into M in Expression (2) leads to Expression (4) below.

$$KM=Mri\times n+(Me+Mc)Mri/Mr \quad (4)$$

A Kendrick mass defect (KMD) is expressed as Expression (5) below.

$$KMD=NKM-KM \quad (5)$$

As described above, a nominal Kendrick mass (NKM) is the integer portion of the KM.

As the first term (Mri×n) on the right side of Expression (4) is an integer, a fractional part will result from only the second term on the right side. The fractional part is a constant value, and does not depend on the degree of polymerization n.

As the first term on the right side of Expression (4) is an integer, a KMD is expressed as Expression (5) below.

$$KMD=\text{Round}\{(Me+Mc)Mri/Mr\}-(Me+Mc)Mri/Mr \quad (6)$$

In the above, "Round { }" means to count fractions over ½ as one and disregard the rest.

Plotting polymers having respective degrees of polymerization (that is, respective peaks in a mass spectrum) in a coordinate system defined by two axes, namely, an abscissa representing the NKM and an ordinate representing the KMD, leads to formation of a KMD plot. In a KMD plot, the respective peaks in the mass spectrum are expressed as peak points (a display element representing a peak). A KMD plot is considered as a peak point map.

A plurality of polymers each having a designated monomer as a structural element and the same end group and adduct ion (that is, a plurality of polymers different only in the degree of polymerization) is expressed on a KMD plot as a bunch of points aligned at constant intervals parallel to the abscissa. Note that a plurality of polymers having the same end groups and adduct ions is included in the same polymer series.

Figure 2:
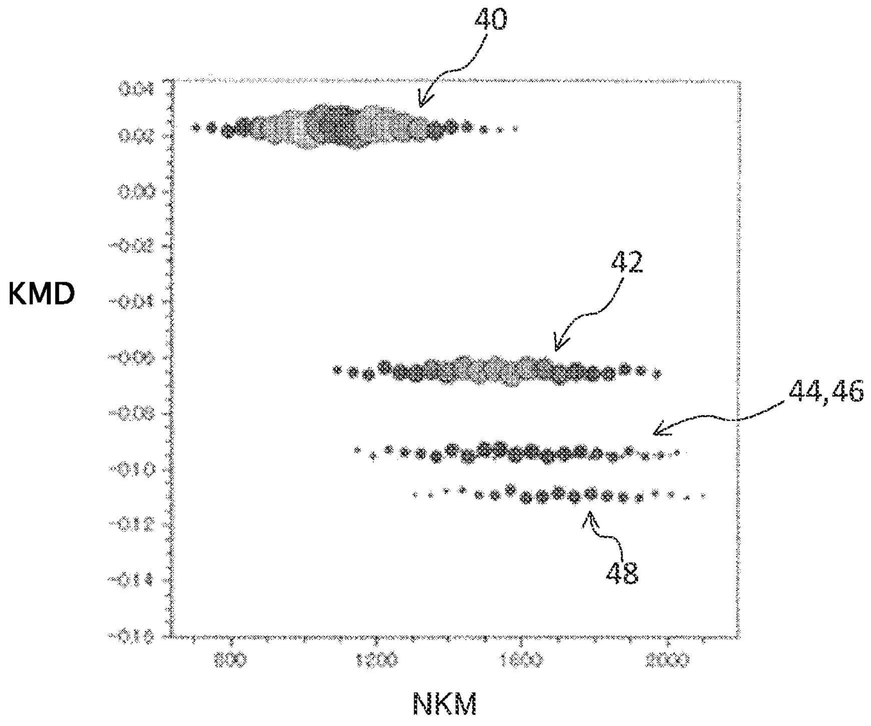
FIG. 2 illustrates one example of a KMD plot.

FIG. 2 illustrates one exemplary KMD plot. As an example here, peaks in a mass spectrum obtained by measuring a mixture of five kinds of polyethylene oxides having different end groups are determined, and deisotope processing is applied to exclude isotopic peaks. A KMD plot obtained through such a peak determination and deisotope processing is illustrated in FIG. 2, in which the mass of $C_2H_4O$ is used as a Mr.

In a KMD plot, polymers in the same polymer series are expressed as a plurality of peak points aligned parallel to the abscissa. In the example illustrated in FIG. 2, five sets (bunches of peak points) aligned parallel to the abscissa are shown on the KMD plot. A KMD plot enables spatial discrimination of a plurality of mass spectral components corresponding to a plurality of respective polymers.

Figure 3:
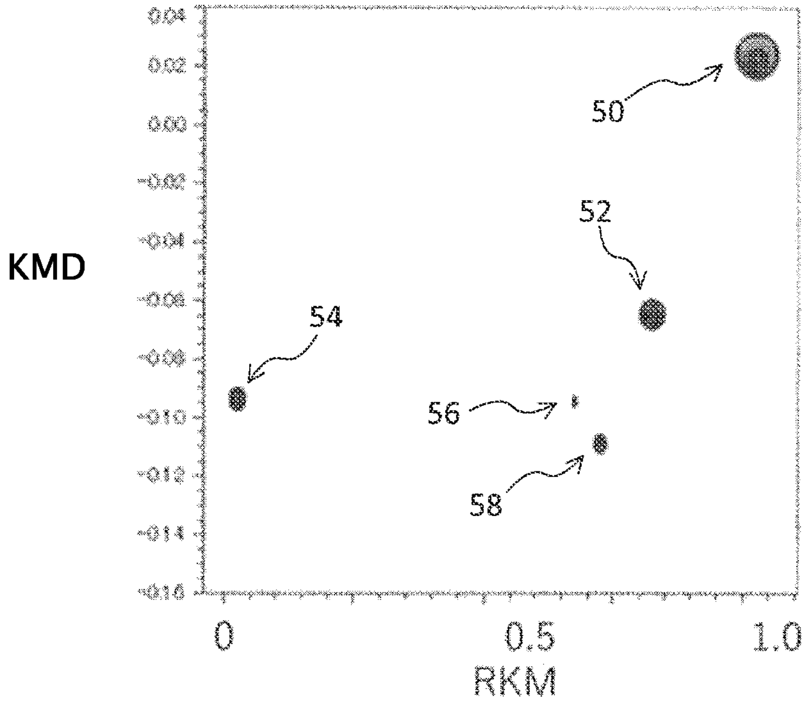
FIG. 3 illustrates one example of an RKM-KMD plot.

An RKM analysis will now be described. According to the RKM analysis, generally, the fractional part of a value obtained by dividing the above-mentioned KM by an Mri is defined as the remainder (RKM) of the KM. Mapping a plurality of peaks as a plurality of peak points in a coordinate system defined by two axes, namely, an abscissa representing the KMR and an ordinate representing the KMD, leads to formation of an RKM-KMD plot. An RKM-KMD plot is considered as a peak point map. FIG. 3 illustrates an exemplary RKM-KMD plot.

An RKM is expressed as Expression (7) below.

$$RKM=KM/Mri-\text{Floor}(KM/Mri) \quad (7)$$

In the above, the value of Floor ( ) is rounded down.

Substituting a KM expressed as Expression (4) into the KM in Expression (7) leads to Expression (8) below.

$$RKM=\{n+(Me+Mc)/Mr\}-\text{Floor}(n+(Me+Mc)/Mr) \quad (8)$$

Being an integer, n is not relevant to the RKM, or a fractional part. Hence, the RKM is expressed as Expression (9) below.

$$RKM=(Me+Mc)/Mr-\text{Floor}((Me+Mc)/Mr) \quad (9)$$

Note that the remainder of dividing an NKM by an Mri may be defined as an RKM.

In an RKM-KMD plot, a plurality of peak points representing a plurality of polymers each containing a designated monomer unit and having the same combination of an end group and a cationization agent concentrate on one point. That is, since the values of Me, Mc, and Mr are the same for the polymers having the same combinations, the same RKM results. Thus, peak points of the same polymer series concentrate on one point. An RKM-KMD plot enables spatial discrimination among a plurality of polymers, based on the difference in combination between an end group and a cationization agent. Note that in the case where the cationization agents are the same, difference in end groups enables spatial discrimination among the plurality of polymers.

As a molecular weight distribution cannot be known from the RKM-KMD plot, the KMD plot, illustrated in FIG. 2, and an RKM-KMD plot, may both be used for analysis.

The above-described KMD plot and RKM-KMD plot are plots formed based on the peak list of peaks contained in a mass spectrum after application of deisotope processing. In the following, respective plots formed based on the peak list of peaks contained in a mass spectrum without deisotope processing applied thereto (that is, a peak list containing isotopic peaks) will be described.

Figure 4:
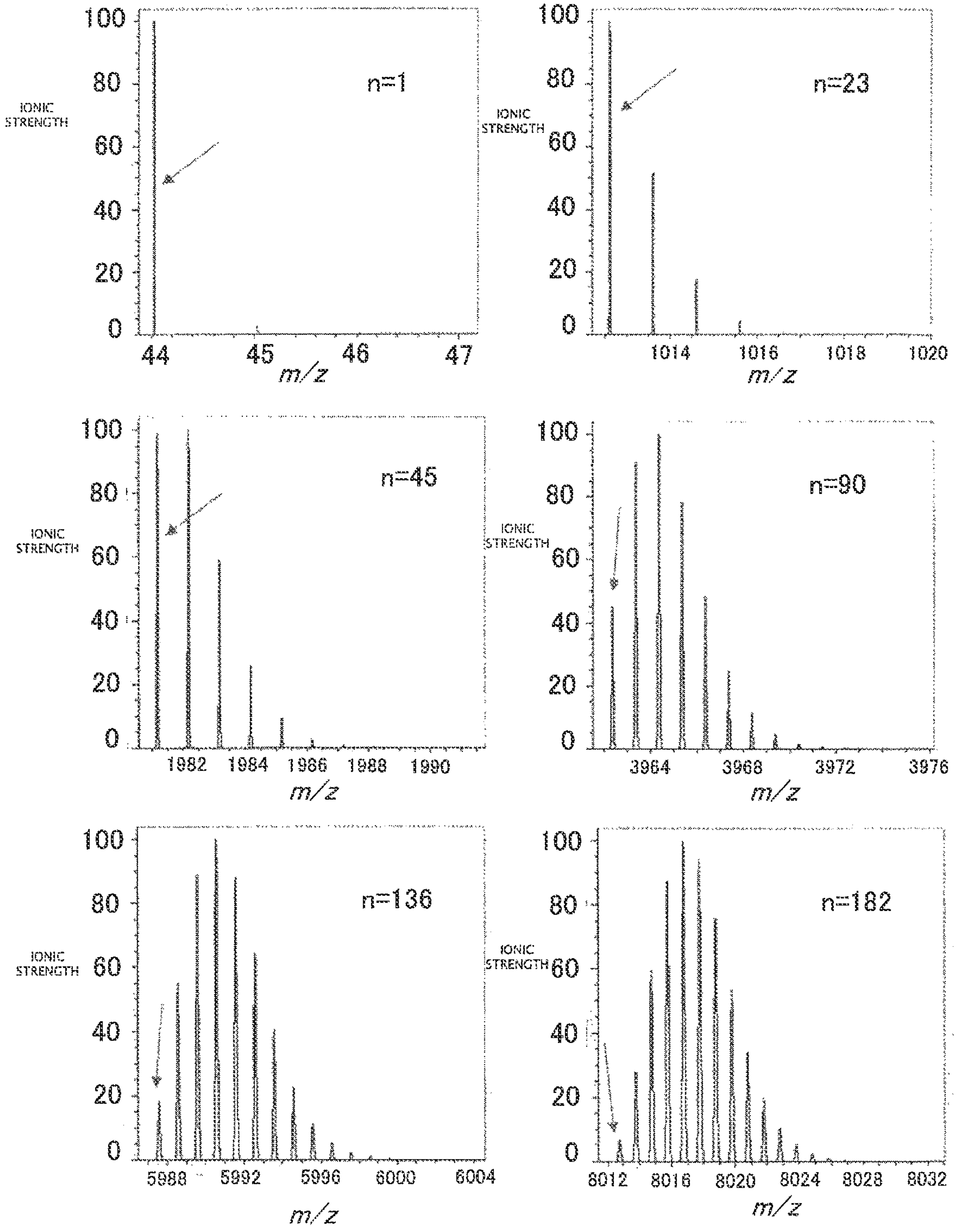
FIG. 4 illustrates isotopic peaks.

Since there are two or more stable isotopes of each of the elements constituting a compound, isotopic peaks are detected in accordance with the elements constituting a component. FIG. 4 illustrates respective isotopic peaks of $(C_2H_4O)_n$. Specifically, isotopic peaks of $(C_2H_4O)_1$, $(C_2H_4O)_{23}$, $(C_2H_4O)_{45}$, $(C_2H_4O)_{90}$, $(C_2H_4O)_{136}$ and $(C_2H_4O)_{182}$ are shown. In each mass spectrum, the abscissa represents the m/z, and the ordinate represents the ionic strength. The m/z of the above-mentioned peaks are about 44, 1000, 2000, 4000, 6000, and 8000, respectively A peak attributed to only stable isotopes having the largest abundance of the respective elements (carbon $^{12}C$, hydrogen $^{1}H$, oxygen $^{16}O$) constituting a compound is referred to as a monoisotopic peak, and is generally a peak having the smallest m/z.

An isotopic peak increases for every 1 u from a monoisotopic peak. The ionic strength of an isotopic peak becomes smaller as the mass becomes larger. In analysis with isotopic peaks included, a monoisotopic peak and an isotopic peak are formed at respective positions apart from each other by an interval of 1 u in a KMD plot and an RKM-KMD plot. In FIG. 4, the respective peaks indicated with the arrows are monoisotopic peaks.

Figure 5:
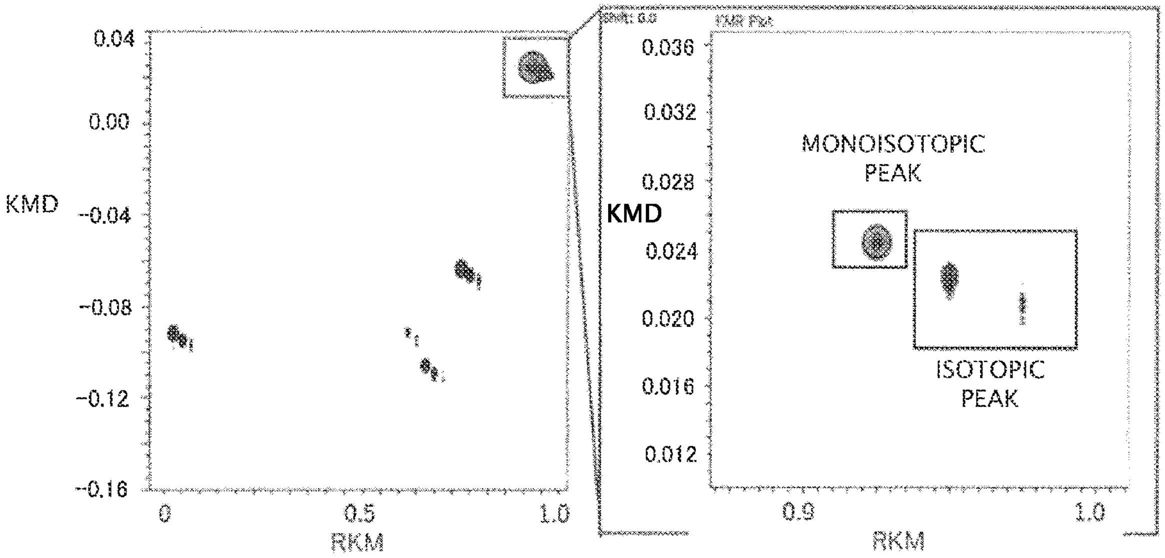
FIG. 5 illustrates one example of an RKM-KMD plot without deisotope processing.

FIG. 5 illustrates an RKM-KMD plot without application of deisotope processing. The RKM-KMD plot illustrated in FIG. 5 is generated by mapping the same data as that on which the RKM-KMD plot illustrated in FIG. 3 is based, without application of deisotope processing.

As the above-described KMD plot and RKM-KMD plot are plots using the accurate mass, spectrometry using these plots is applied mainly to polymers having a molecular weight of 3000 or less.

An NKM-RKM plot for analyzing polymers having a relatively large molecular weight will now be described. A plurality of peaks are mapped as a plurality of peak points in a coordinate system defined by two axes, namely, an abscissa representing the NKM and an ordinate representing the RKM, to thereby generate an NKM-RKM plot.

In analysis of a plurality of polymers each having a designated monomer unit and the same combination of an end group and a cationization agent, the RKM of these polymers have the same value, as described above. Thus, these polymers are expressed as a bunch of points aligned parallel to the abscissa in the NKM-RKM plot.

As the ionic strength of the monoisotopic peak becomes smaller as the molecular weight of an analysis target becomes larger, analysis may be made without application of deisotope processing. In this case, isotopic peaks have a larger influence, as described above. A peak having the largest ionic strength among the isotopic ionic peaks shifts toward the side of a larger mass as the molecular weight becomes larger. In this case, a bunch of peak points representing the same polymer series in the NKM-RKM plot is distributed spreading diagonally right-upward.

Figure 6:
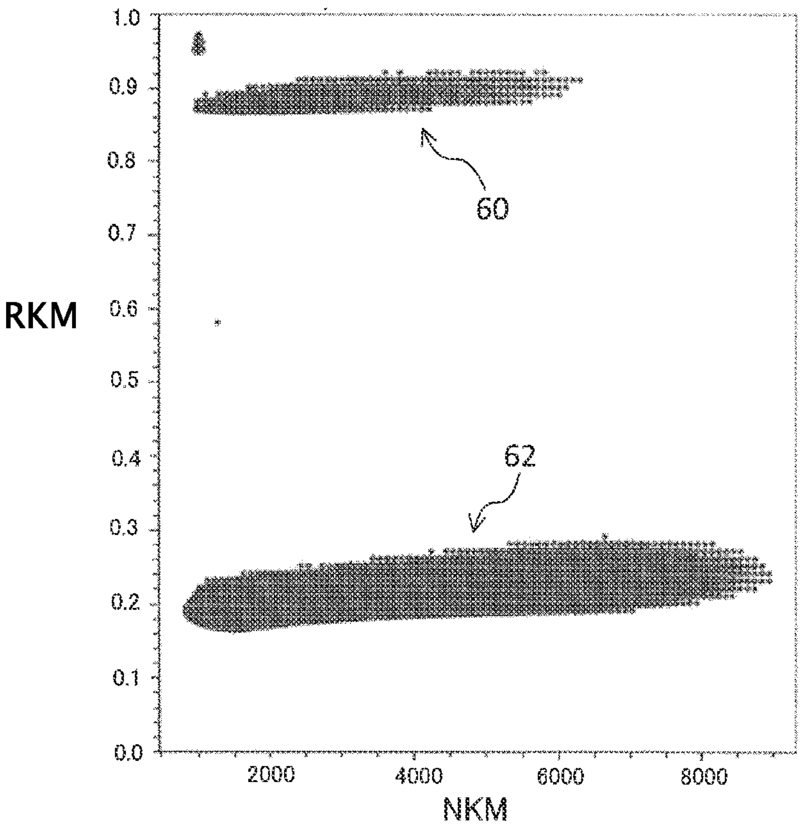
FIG. 6 illustrates one example of an NKM-RKM plot.

FIG. 6 illustrates one exemplary NKM-RKM plot. This plot is the NKM-RKM plot of polymethyl methacrylate, which has a molecular weight distribution spreading to an area with the m/z of about 1000 to 8000. The mass of $C_5H_8O_2$ is used as the Mr.

In the embodiments to be described below, use of a bunch of peak points contained in the above-described plots enables identification of the same polymer series contained in a mass spectrum.

Structure of Mass Spectrometer System 10

Figure 7:
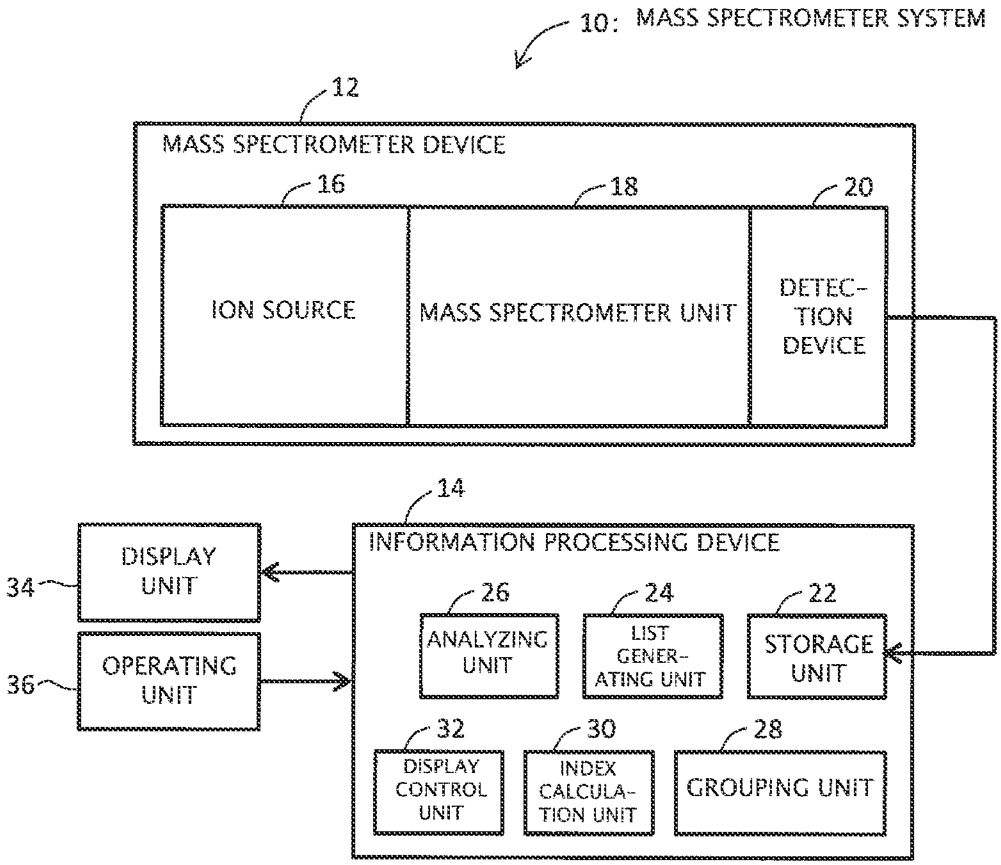
FIG. 7 is a block diagram illustrating the structure of a mass spectrometer system according to an embodiment.

Referring to FIG. 7, a mass spectrometer system 10 according to an embodiment will be described. FIG. 7 is a block diagram illustrating the structure of a mass spectrometer system 10.

The mass spectrometer system 10 includes a mass spectrometer device 12 and an information processing device 14. The information processing device 14 functions as a mass spectrum processing device. As will be described later, the information processing device 14 calculates values such as KM, KMD, NKM, RKM, and the like, and generates a plot such as a KMD plot, an RKM-KMD plot, an NKM-RKM, or the like. A sample to be analyzed is a synthetic polymer or a natural polymer. Specifically, the sample is a mixture containing a plurality of kinds of polymers. Note that other samples may be analyzed.

The mass spectrometer device 12 includes an ion source 16, a mass spectrometer unit 18, and a detection device 20, each of which is an instrument including an electrical component and a mechanical component.

The ion source 16 is, for example, an ion source in accordance with Matrix Assisted Laser Desorption/Ionization (MALDI). According to MALDI, mainly, monovalent ions are generated. Other types of ion sources may be used.

The mass spectrometer unit 18 is an instrument for mass separation, depending on the mass (precisely, the m/z) of an ion. For example, a Time-of-Flight Mass spectrometer is used. Other types of mass spectrometers may be used.

The detection device 20 is an instrument for detecting ions. An output signal from the detection device 20 corresponds to a mass spectrum. An output signal corresponding to a mass spectrum is inputted to the information processing device 14.

The information processing device 14 is a device that functions as a mass spectrum processing device, as described above. The respective functions of the information processing device 14 are implemented through cooperation between hardware and software, for example. Specifically, the information processing device 14 includes one or more processors, such as a Central Processing Unit (CPU), or the like. The one or more processors reads a program from a memory device, not illustrated (for example, a memory, a hard disk drive, and so forth), and executes the program, whereby the respective functions of the information processing device 14 are implemented. A program for implementing the respective functions may be stored, for example, in a portable recording medium or the information processing device 14 via a network. For example, the information processing device 14 may include a personal computer (PC). In another example, the respective functions of the information processing device 14 may be implemented using hardware resources, such as a processor, an electronic circuit, an Application Specific Integrated Circuit (ASIC), and so forth. For implementation, a device such as a memory may be used. In a still another example, the respective functions of the information processing device 14 may be implemented using a Digital Signal Processor (DSP) or a Field Programmable Gate Array (FPGA), or the like. The information processing device 14 may include a plurality of information processing devices.

The information processing device 14 includes, for example, a storage unit 22, a list generating unit 24, an analyzing unit 26, a grouping unit 28, an index calculation unit 30, and a display control unit 32.

The information processing device 14 is connected to a display unit 34 and an operating unit 36. The display unit 34 is, for example, a liquid crystal display, an electroluminescent (EL) display, or the like. The display unit 34 displays, for example, mass spectra, plots, polymer indexes, and so forth.

The operating unit 36 is, for example, a keyboard, a pointer (for example, a mouse, a touch panel, or a pen tablet). For example, a user operates the operating unit 36 to input various information items to the information processing device 14. Specifically, operating the operating unit 36, a user designates the mass of a monomer unit, a grouping condition, to be described later, a monomer index, or the like.

The storage unit 22 includes, for example, a storage device, such as a memory, a hard disk drive, or the like. The storage unit 22 stores a mass spectrum generated by the mass spectrometer device 12.

The list generating unit 24 executes peak determination with respect to a mass spectrum to be analyzed (or an analyzing target mass spectrum) to generate a peak list. Note that a user may designate an analyzing target peak to generate a peak list by operating the operating unit 36.

The analyzing unit 26 calculates values such as KM, NKM, KMD, RKM, or the like of a designated monomer unit for an analyzing target mass spectrum, to generate a peak point map, based on the peak list. Examples of a peak point map include a KMD plot, an RKM-KMD plot, an NKM-RKM plot, or the like. For example, operating the operating unit 36, a user designates the mass (an integer mass and an accurate mass) of a monomer unit.

The grouping unit 28 groups the peaks contained in the peak list, based on a grouping condition. A grouping condition is set, for example, using a KMD plot, an RKM-KMD plot, an NKM-RKM plot, or the like. For example, operating the operating unit 36, a user designates a grouping condition. Note that a grouping condition may be set in advance.

The index calculation unit 30 calculates a polymer index of a group, based on the ionic strength of each of the peaks contained in the group for every group. Examples of a polymer index include a total ionic strength Itotal, a number-average molecular weight Mn, a weight-average molecular weight Mw, a polydispersity PD, a number-average degree of polymerization Dpn, a weight-average degree of polymerization Dpw, or the like. A polymer index is a value representing the nature of a polymer. The respective values are defined as Expressions (10) to (14) below.

[Expression 10 to 14]

$$Mn=\Sigma(Mi*ni)/\Sigma ni \tag{10}$$

$$Mw=\Sigma(Mi^2*ni)/\Sigma(Mi*ni) \tag{11}$$

$$PD=Mw/Mn \tag{12}$$

$$DPn=Mn/R \tag{13}$$

$$DPw=Mw/R \tag{14}$$

In the above, Mi is the weight of a polymer ion specified by the degree of polymerization i; ni is the amount of polymer ions specified by the degree of polymerization i. R is the mass of a repeating unit (a monomer). Note that a maximum value and a minimum value of the range of the degrees of polymerization i are designated by a user or set in advance. Each polymer index indicates the characteristic of a group of polymers. That is, each polymer index is information reflecting the characteristic of a group of polymers.

The display control unit 32 displays various information items on the display unit 34. For example, the display control unit 32 displays a mass spectrum, a KMD plot, an RKM-KMD plot, an NKM-RKM plot, a monomer index, and so forth, on the display unit 34.

Processing in First Embodiment

Figure 8:
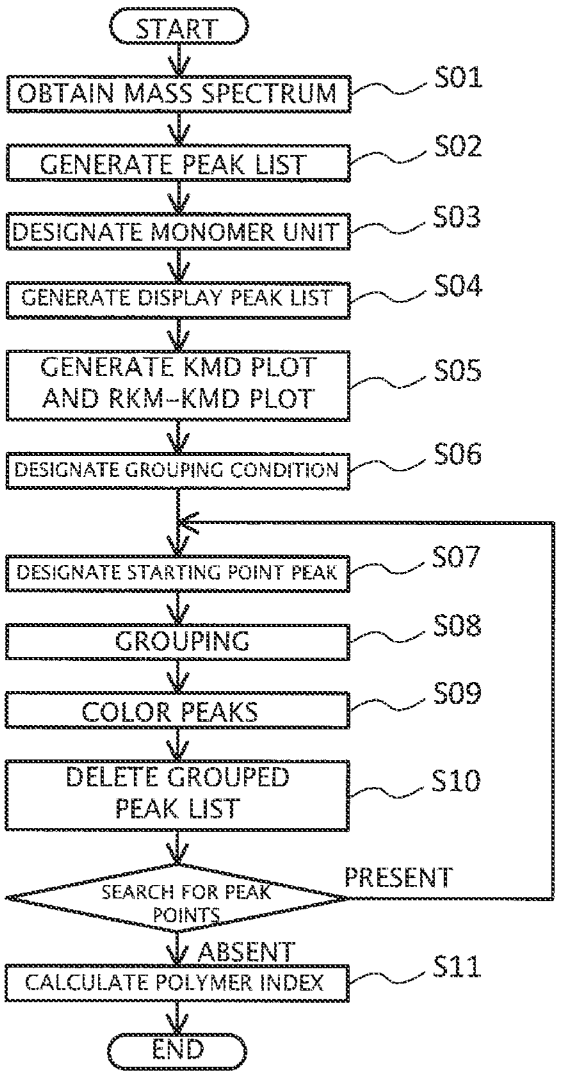
FIG. 8 is a flowchart of processing in a first embodiment.

Referring to FIG. 8, processing relevant to the first embodiment will now be described. FIG. 8 is a flowchart of the processing relevant to the first embodiment.

Initially, the mass spectrometer device 12 obtains the mass spectrum of a sample containing a plurality of kinds of polymers, and the mass spectrum is stored in the storage unit 22 of the information processing device 14 (S01). For example, the mass spectrum illustrated in FIG. 1 is obtained. A mass spectrum is composed of a plurality of peaks aligned discrete on the m/z axis. The display control unit 32 may display the mass spectrum on the display unit 34.

Thereafter, the list generating unit 24 executes peak determination with respect to the mass spectrum to thereby generate a peak list (S02). The peak list is an analyzing target peak list. For example, the list generating unit 24 identifies all peaks contained in the mass spectrum to specify the m/z and the ionic strength of each peak, and generates a peak list showing the combinations of the m/z and ionic strengths of the respective peaks, to define the generated peak list as an analyzing target peak list. Alternatively, the list generating unit 24 may identify the peaks contained in a specific range of the m/z to generate a peak list showing such combinations of the peaks contained in that range as an analyzing target peak list. The range may be designated by a user or set in advance. Note that a user may designate an analyzing target peak operating the operating unit 36. For example, referring to the mass spectrum displayed on the display unit 34, a user designates an analyzing target peak, and a peak list showing the above-mentioned combinations of the designated peak is generated as an analyzing target peak list. Note that the list generating unit 24 may execute deisotope processing.

FIG. 9 illustrates an exemplary analyzing target peak list. The analyzing target peak list contains, for example, a combination of the m/z and ionic strength of each peak. Although the analyzing target peak list is expressed in the form of a table in the example illustrated in FIG. 9, the analyzing target peak list may be expressed in the same form as that of the mass spectrum illustrated in FIG. 1.

Thereafter, operating the operating unit 36, a user designates a monomer unit contained in the analyzing target peak list (S03). Specifically, the mass (an integer mass and an accurate mass) of a monomer unit is designated. Note that the mass of a monomer unit may be designated in advance.

The analyzing unit 26 copies the analyzing target peak list to generate a peak list for display (a display peak list) (S04). The analyzing target peak list is a list to be analyzed by the analyzing unit 26, to be described later. Meanwhile, the display peak list is a list to be displayed on the display unit 34.

FIG. 10 illustrates an exemplary display peak list. A combination of the m/z and ionic strength of each peak contained in the display peak list is the same as that of each peak contained in the analyzing target peak list illustrated in FIG. 9. In the display peak list, respective peaks belonging to the same group are displayed in the same color, and those belonging to different groups are displayed in different colors, as will be described later. That is, the respective peaks are displayed in different colors for every group. In the example illustrated in FIG. 10, colors correspond to the types of hatching. That is, peaks displayed in the same color (that is, peaks in the same group) are shown hatched in the same manner. Note that the display peak list may be expressed in the same form as that of the mass spectrum illustrated in FIG. 1, not necessary in the form of a table. In this case, the respective peaks in a mass spectrum are expressed in different colors for every group.

Thereafter, the analyzing unit 26 generates a peak point map, based on the plurality of peaks contained in the analyzing target peak list (S05). In the first embodiment, the analyzing unit 26 generates a KMD plot and an RKM-KMD plot as a peak point map. For example, the analyzing unit 26 generates the KMD plot illustrated in FIG. 2 and the RKM-KMD plot illustrated in FIG. 3.

The KMD plot illustrated in FIG. 2 contains peat point sets 40, 42, 44, 46, 48. Note that the peak point sets 44, 46 have close KMDs. Each peak point set is composed of a plurality of peak points aligned parallel to the abscissa. Each peak point corresponds to each of the peaks constituting the mass spectrum of a monomer.

The RKM-KMD plot illustrated in FIG. 3 contains peak point sets 50, 52, 54, 56, 58. The peak point set 50 corresponds to the peak point set 40; the peak point set 52 corresponds to the peak point set 42; the peak point set 54 corresponds to the peak point set 44; the peak point set 56 corresponds to the peak point set 46; and the peak point set 58 corresponds to the peak point set 48. Each peak point set is composed of a plurality of peak points corresponding to each of a plurality of degrees of polymerization, and the plurality of peak points are displayed superimposed on one point at the same coordinates. Each peak point corresponds to each of the peaks constituting the mass spectrum of a monomer.

As described above, use of a coordinate system (a coordinate system for a KMD plot, a coordinate system for an RKM-KMD plot) that has a function of grouping peak points for every polymer enables accurate separation of the mass spectrum of a polymer of interest from those of other polymers. As a coordinate system having such a function, coordinate systems other that the above-described coordinate system may be used.

Thereafter, operating the operating unit 36, a user designates a condition for grouping the peaks (S06). The grouping condition designated here contains a permissible range of the KMD of a starting point peak, to be described later, and a permissible range of the RKM of the starting point peak. The permissible range of the RKM may be designated within the range between 0 and 1 as a fractional part of a value obtained by dividing the KM by the Mri or within the range between 0 and the Mri as a remainder of dividing the NKM by the Mri. Alternatively, a user may designate the range of the NKM of peaks to be grouped.

The display control unit 32 may display a KMD plot and an RKM-KMD plot on the display unit 34. In this case, referring to the displayed KMD plot and RKM-KMD plot, a user may designate a permissible range of the KMD and that of the RKM on the plot.

Thereafter, operating the operating unit 36, the user designates a starting point peak on the mass spectrum (S07). For example, the mass spectrum is displayed on the display unit 34, and the user designates a starting point peak on the displayed mass spectrum. Alternatively, the analyzing target peak list may be displayed on the display unit 34, and the user may designate a starting point peak, referring to the displayed analyzing target peak list.

Also, the user designates the lower limit of the ionic strength of the starting point peak and the maximum number of groups to be made. The lower limit and the maximum number may be set in advance.

Alternatively, the user may designate the range of the m/z (an m/z range) to select a starting point peak, and the grouping unit 28 may select a peak having a maximum ionic strength from among those included in the m/z range as a starting point peak.

Alternatively, a KMD plot or an RKM-KMD plot may be displayed on the display unit 34, and the user may designate a starting point peak on these plots.

Thereafter, the grouping unit 28 groups a plurality of peaks that satisfy the grouping condition, using the starting point peak as a reference (S08). That is, the grouping unit 28 makes a plurality of peaks satisfying the grouping condition, with the starting point peak as a reference, belong to the same group. The plurality of peaks belonging to the same group constitute the same polymer series. Specifically, the grouping unit 28 makes peaks each having a KMD included in the permissible range of the KMD designated in step S06 with the KMD of the starting point peak as a reference, and also an RKM included in the permissible range of the RKM designated in step S06 with the RKM of the starting point peak as a reference, belong to the same group. The plurality of peaks belonging to the same group constitute the same polymer series.

The grouping unit 28 shows the grouped peaks in the display peak list in a color different from that of other peaks (S09). This clearly shows that peaks are grouped. In the case where two or more groups are formed, the grouping unit 28 shows the peaks in the respective groups in different colors for every group.

In the example illustrated in FIG. 10, peaks belonging to one group are displayed in a first color (for example, red), and those belonging to another group are displayed in a second color (for example, blue). As grouping processing progresses, the peaks contained in the display peak list are divided into the same group or other groups, whereby two or more groups are formed. Consequently, respective peaks belonging to the respective groups are displayed in different colors for every group in the display peak list. In the case of a display peak list expressed in the same form as that of the mass spectrum, peaks belonging to a group are shown in a first color in the mass spectrum, and those in another group are shown in a second color. This is similarly applied to other groups.

The grouping unit 28 deletes the grouped peaks (hereinafter referred to as "a grouped peak list") from the analyzing target peak list (S10).

Until the number of groups formed by the grouping unit 28 becomes equal to the maximum number of groups set in step S07 or the ionic strength of the starting point peak becomes less than the lower limit set in step S07, the processes in steps S07 to S10 are repeatedly executed.

Once groups are formed as described above, the index calculation unit 30 calculates a polymer index of each group, based on the ionic strength of the respective peaks contained in the group, for every group (S11). As described above, examples of a polymer index include a total ionic strength Itotal, a number-average molecular weight Mn, a weight-average molecular weight Mw, a polydispersity PD, a number-average degree of polymerization Dpn, a weight-average degree of polymerization Dpw, or the like. The index calculation unit 30 may calculate the value of a polymer index designated by a user among the above-mentioned polymer indexes, or calculate a predetermined polymer index.

The display control unit 32 may display the polymer index calculated by the index calculation unit 30 on the display unit 34. The display control unit 32 may display the polymer index together with the KMD plot and/or the RKM-KMD plot on the display unit 34.

The display control unit 32 may display the display peak list illustrated in FIG. 10 on the display unit 34. Note that the grouping unit 28 may color the peaks belonging to the same group in the mass spectrum illustrated in FIG. 1 with the same color for every group, and the display control unit 32 may display the mass spectrum colored for every group on the display unit 34.

The display peak list, the KMD plot, the RKM-KMD plot, and the calculated polymer index, or the like, may be outputted to an external device.

According to the first embodiment, designation by a user of the permissible range of the KMD and that of the RKM as a grouping condition enables grouping a plurality of peaks constituting the same polymer series. As described above, it is possible to group a plurality of peaks constituting the same polymer series with a simple operation. Further, it is possible to calculate a polymer index of each group to present to a user.

Processing in Second Embodiment

Figure 11:
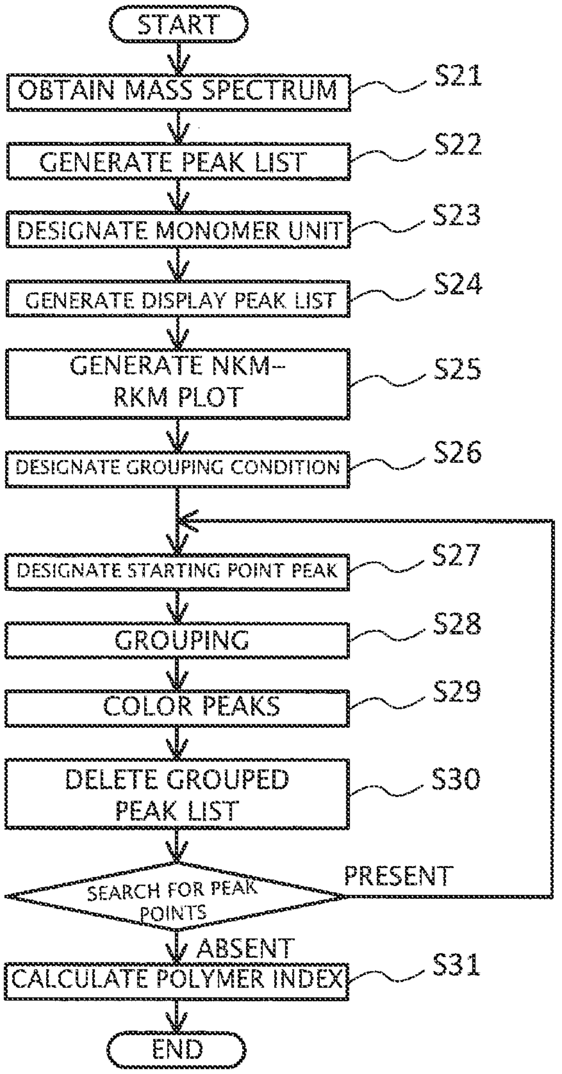
FIG. 11 is a flowchart of processing in a second embodiment.

Referring to FIG. 11, processing relevant to a second embodiment will now be described. FIG. 11 is a flowchart of the processing relevant to the second embodiment.

Initially, the mass spectrometer device 12 obtains the mass spectrum of a sample containing a plurality of kinds of polymers, and stores the mass spectrum in the storage unit 22 of the information processing device 14 (S21). For example, the mass spectrum illustrated in FIG. 1 is obtained. The display control unit 32 may display the mass spectrum on the display unit 34.

Thereafter, the list generating unit 24 executes peak determination with respect to the mass spectrum to thereby generate a peak list (S22). The peak list is an analyzing target peak list. For example, the analyzing target peak list illustrated in FIG. 9 is generated. Note that the list generating unit 24 may execute deisotope processing.

Thereafter, operating the operating unit 36, a user designates a monomer unit contained in the peak list (S23). Specifically, the mass of a monomer unit (an integer mass and an accurate mass) is designated. Note that the mass of a monomer unit may be designated in advance.

The analyzing unit 26 copies the analyzing target peak list to generate a display peak list (S24). For example, the display peak list illustrated in FIG. 10 is generated.

Thereafter, the analyzing unit 26 generates a peak point map, based on the plurality of peaks contained in the analyzing target peak list (S25). In the second embodiment, the analyzing unit 26 generates an NKM-RKM plot as a peak point map. For example, the analyzing unit 26 generates the NKM-RKM plot illustrated in FIG. 6. The NKM-RKM plot illustrated in FIG. 6 contains peak point sets 60, 62. The respective peak points correspond to the respective peaks constituting the mass spectrum of a monomer.

As described above, use of a coordinate system (a coordinate system for an NKM-RKM plot) that has a function of grouping peak points for every polymer enables accurate separation of the mass spectrum of a polymer of interest from those of other polymers. As a coordinate system having such a function, coordinate systems other that the above-described coordinate system may be used.

Thereafter, operating the operating unit 36, a user designates a condition for grouping the peaks (S26). The grouping condition designated here contains the permissible range of the RKM of a starting point peak, to be described later. The permissible range of the RKM may be designated within the range between 0 and 1 as a fractional part of a value obtained by dividing a KM by an Mri or within the range between 0 and an Mri as a remainder of dividing an NKM by an Mri. Alternatively, a user may designate the range of the NKM of peaks to be grouped.

The display control unit 32 may display the NKM-RKM plot on the display unit 34. In this case, referring to the displayed NKM-RKM plot, the user may designate a permissible range of the RKM on the plot.

Thereafter, operating the operating unit 36, the user designates a starting point peak, referring to the mass spectrum (S27). For example, the mass spectrum is displayed on the display unit 34, and the user designates a starting point peak on the displayed mass spectrum. The user may designate a starting point peak, referring to the analyzing target peak list.

Also, the user designates the lower limit of the ionic strength of the starting point peak and the maximum number of groups to be made. The lower limit and the maximum number may be set in advance.

Alternatively, the user may designate an m/z range to select a starting point peak, and the grouping unit 28 may select a peak having a maximum ionic strength from among the peaks contained in the designated m/z range as a starting point peak.

Alternatively, the NKM-RKM plot may be displayed on the display unit 34, and the user may designate a starting point peak on the plot.

Thereafter, the grouping unit 28 groups a plurality of peaks that satisfy the grouping condition, using the starting point peak as a reference (S28). That is, the grouping unit 28 makes a plurality of peaks satisfying the grouping condition, with the starting point peak as a reference, belong to the same group. The plurality of peaks belonging to the same group constitute the same polymer series. Specifically, the grouping unit 28 makes the peaks each having an RKM included in the permissible range of the RKM designated in step S26, with the RKM of the starting point peak as a reference, belong to the same group. The plurality of peaks belonging to the same group constitute the same polymer series.

The grouping unit 28 shows the grouped peaks in the display peak list in a color different from those of other peaks (S29). This clearly shows that peaks are grouped. In the case where two or more groups are formed, the grouping unit 28 shows the peaks in the respective groups in different colors for every group. FIG. 10 illustrates an exemplary display.

The grouping unit 28 deletes the grouped peak list, or grouped peaks, from the analyzing target peak list (S30).

Until the number of groups formed by the grouping unit 28 becomes equal to the maximum number of groups set in step S27 or the ionic strength of the starting point peak becomes less than the lower limit set in step S27, the processes in steps S27 to S30 are repetitively executed.

Once groups are formed as described above, the index calculation unit 30 calculates a polymer index of each group, based on the ionic strength of the respective peaks contained in the group, for every group (S31).

The display peak list, the NKM-RKM plot, and the calculated polymer index, or the like, may be outputted to an outside device.

According to the second embodiment, designation by a user of the permissible range of the RKM as a grouping condition enables grouping a plurality of peaks constituting the same polymer series. As described above, it is possible to group a plurality of peaks constituting the same polymer series with a simple operation. Further, it is possible to calculate a polymer index of each group to present to a user.

Third Embodiment

A third embodiment will now be described. In mass spectrometry, generally, a mass error becomes larger as the molecular weight becomes larger. That is, the KMD varies more largely.

In the third embodiment, the grouping unit 28 groups a plurality of peaks contained in the analyzing target peak list while changing the permissible range of the KMD, depending on the NKM of the peaks. For example, the grouping unit 28 gradually, or in a stepwise manner, makes the permissible range of the KMD larger as the NKM becomes larger.

For example, the third embodiment is incorporated in the first embodiment. In the first embodiment, the grouping unit 28 changes the permissible range of the KMD, depending on the NKM of the peaks, and makes the peaks each having a KMD included in the permissible range of the KMD with the KMD of the starting point peak as a reference, and also an RKM included in the permissible range of the RKM with the RKM of the starting point peak as a reference, belong to the same group.

Figure 12:
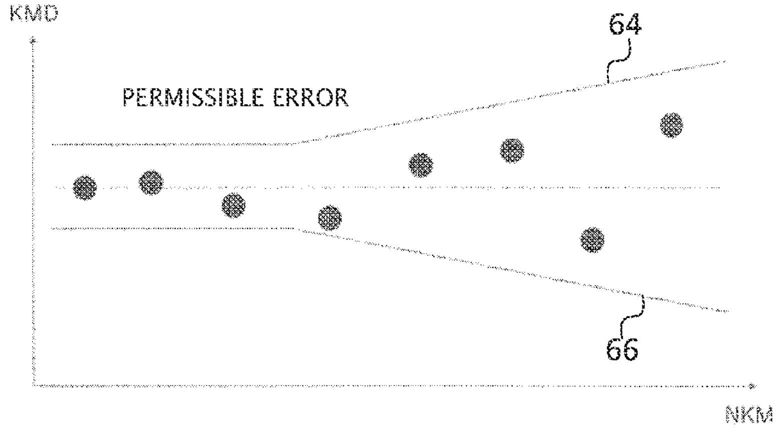
FIG. 12 illustrates one example of a permissible range of KMD in accordance with NKM.

FIG. 12 illustrates one exemplary permissible range of the KMD in accordance with the NKM. The plot illustrated in FIG. 12 is a KMD plot. Reference numeral 64 indicates the upper limit of the permissible range of the KMD, while reference numeral 66 indicates the lower limit of the permissible range of the KMD. That is, the range between the line indicated with reference numeral 64 and the line indicated with reference numeral 66 is the permissible range of the KMD.

For example, in an area with small NKMs, the permissible range of the KMD is constant. Meanwhile, in an area in excess of a certain NKM (the threshold of the NKM), for example, the permissible range of the KMD becomes wider in accordance with the NKM. Specifically, in the area in excess of the threshold, for example, the permissible range of the KMD becomes wider in proportion to the NKM. That is, the upper limit indicated with reference numeral 64 becomes larger in proportion to the NKM, while the lower limit indicated with reference numeral 66 becomes smaller in proportion to the NKM.

Note that the permissible range illustrated in FIG. 12 is merely an example. Only either one of the upper limit and the lower limit may change in accordance with the NKM, or at least one of the upper limit and the lower may change so as to draw a curved line on the KMD plot.

Fourth Embodiment

A fourth embodiment 4 will now be described. In the fourth embodiment, a permissible range of the RKM is set in consideration of the distribution of isotopic peaks.

As described with reference to FIG. 4, the distributions of isotopic peaks differ for every mass. In particular, the number of isotopic peaks to be groups becomes larger as the molecular weight becomes larger.

In view of the above, in the fourth embodiment, a monoisotopic peak is used as a starting point peak. For example, the grouping unit 28 may designate a monoisotopic peak as a starting point peak in grouping, or a user may designate a monoisotopic peak as a starting point peak. For example, a monoisotopic peak is designated as a starting point peak, based on a peak list subjected to deisotope processing. Note that as it is necessary that deisotope processing can be applied, it is preferred that the molecular weight distribution of a polymer expands to an area with the m/z of about 1000 to 2000.

Also, the grouping unit 28 changes the permissible range of the RKM of the peaks to be grouped, depending on the molecular weight. For example, the grouping unit 28 makes the permissible range of the RKM of the peaks to be grouped larger as the NKM becomes larger.

The grouping unit 28 calculates the number of isotopic peaks in order to determine the permissible range of the RKM. For example, in the case of a sample made from polyethylene oxide, the grouping unit 28 calculates the pattern of isotopes while changing n in $(C_2H_4O)n$ to calculate the number of isotopic peaks. Then, the grouping unit 28 sets a permissible range of the RKM in accordance with the calculated number.

Figure 13:
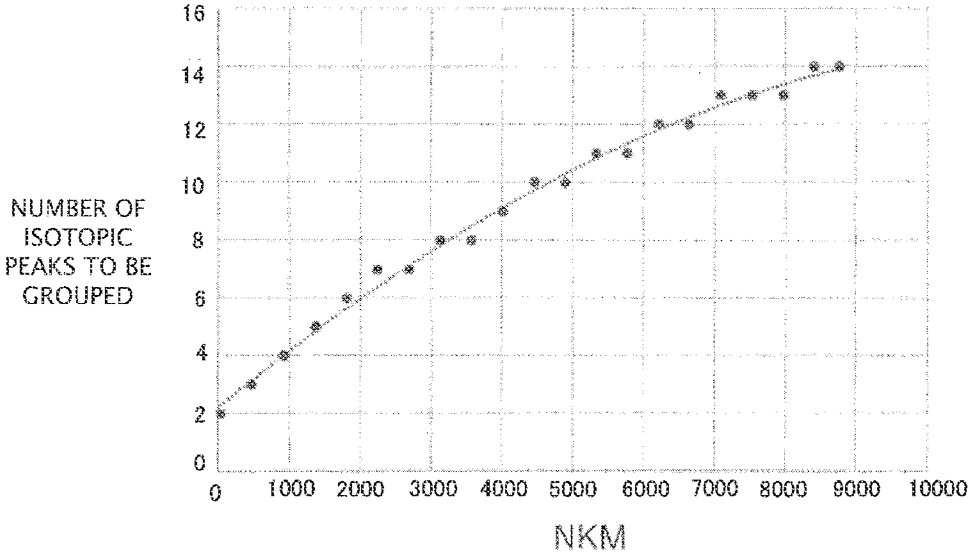
FIG. 13 shows the number of isotopic peaks to be grouped.

FIG. 13 shows the number of isotopic peaks to be grouped, relative to the NKM. This number includes a monoisotopic peak. An isotonic peak having an ionic strength of 1% or over of the maximum ionic strength is counted.

In the case where the RKM is a fractional part of a value obtained by dividing a KM by an Mri, and that the range of the RKM is designated within the range between 0 and 1, the range of the fractional part of a value obtained by dividing the NKM illustrated in FIG. 13 by an Mri is used as the range of the RKM.

In the case where the RKM is the remainder of dividing the NKM by an Mri, and that the range of the RKM is designated within the range between 0 and an Mri, the remainder is used as the range of the RKM.

Fifth Embodiment

A fifth embodiment will now be described.

In the above-described fourth embodiment, a sample having a molecular weight distribution expanding to a relatively low molecular area, or a sample being adapted to deisotope processing, is assumed. In the case where the molecular weights of polymers are distributed only in a macromolecular area, a monoisotopic peak may not be readily identified. In such a case, the grouping unit 28 defines a peak having a maximum ionic strength among the isotopic peaks as a starting point peak to execute grouping.

For example, the grouping unit 28 specifies a peak having a maximum ionic strength among the isotopic peaks, based on the calculated pattern of isotopes, described in the fourth embodiment.

Figure 14:
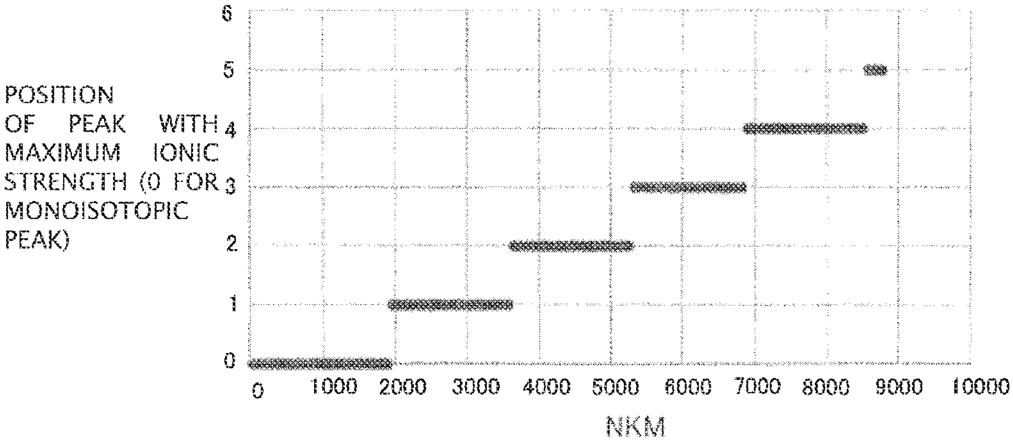
FIG. 14 illustrates the position of an isotopic peak with a maximum ionic strength.

FIG. 14 illustrates the position of an isotopic peak having a maximum ionic strength (the position of a monoisotopic peak is at 0). A sample is of polyethylene oxide.

The grouping unit 28 defines the peak having a maximum ionic strength as a starting point peak, and makes the permissible range of the RKM larger as the NKM becomes larger to execute grouping, similar to the fourth embodiment.

Sixth Embodiment

A sixth embodiment will now be described.

A mass spectrum may contain a peak attributed to a material that is not a polymer. For example, a peak attributed to matrix or additive agent may be contained in a mass spectrum. As such peaks do not appear in units of a monomer unit, such peaks appear less frequently than a peak attributed to a polymer in the mass spectrum of polymers in the same group.

In the sixth embodiment, the grouping unit 28 determines whether the grouped peaks are attributed to a polymer, referring to the lower limit of the number of grouped peaks. A lower limit may be designated by a user or set in advance.

For example, in the case where the number of peaks contained in a group formed through grouping is greater than the lower value, the grouping unit 28 determines that the peaks contained in the group are attributed to a polymer.

On the other hand, in the case where the number of peaks contained in the group is equal to or less than the lower limit, the grouping unit 28 determines that the peaks contained in the group are not attributed to a polymer.

The invention claimed is:

1. A mass spectrum processing device, comprising:

a list generating unit for executing peak determination with respect to a mass spectrum of a sample containing a synthetic polymer to generate a peak list;

an analyzing unit for calculating a Kendrick mass (KM) of a designated monomer, for each of a plurality of peaks contained in the peak list to calculate an RKM, the RKM being a fractional part of a value obtained by dividing the KM by an integer mass of the monomer, or a remainder of dividing a nominal Kendrick mass (NKM) by the integer mass of the monomer; and a grouping unit for grouping a plurality of peaks that are contained in the peak list and satisfy a grouping condition, the grouping condition comprising a permissible range of an RKM of a starting point peak.

2. The mass spectrum processing device according to claim 1, wherein the analyzing unit further calculates a Kendrick mass defect (KMD) of the monomer for each of the plurality of peaks contained in the peak list, and the grouping unit groups a plurality of peaks that are contained in the peak list and satisfy a grouping condition, the grouping condition including a permissible range of a KMD of the starting point peak and the permissible range of the RKM of the starting point peak.

3. The mass spectrum processing device according to claim 1, wherein the analyzing unit plots the plurality of peaks contained in the peak list as a plurality of peak points in a coordinate system defined by two axes representing the RKM and the NKM, respectively, the NKM being an integer portion of the KM, to thereby generate an NKM-RKM plot, and the NKM-RKM plot is displayed on a display.

4. The mass spectrum processing device according to claim 2, wherein the analyzing unit plots the plurality of peaks contained in the peak list as a plurality of peak points in a coordinate system defined by two axes representing the KMD and the NKM, respectively, the NKM being an integer portion of the KM, to thereby generate a KMD plot, and plots the plurality of peaks contained in the peak list as a plurality of peak points in a coordinate system defined by two axes representing the KMD and the RKM, to thereby generate an RKM-KMD plot, and the KMD plot and the RKM-KMD plot are displayed on a display.

5. The mass spectrum processing device according to claim 1, wherein the grouping unit generates a display peak list, based on the peak list, such that peaks contained in respective groups are shown in respective different colors for every group in the display peak list.

6. The mass spectrum processing device according to claim 1, further comprising an index calculation unit for calculating a polymer index of each group for every group, based on an ionic strength of the respective peaks contained in the group.

7. The mass spectrum processing device according to claim 1, wherein the analyzing unit deletes the grouped peaks from the peak list, and executes grouping with respect to a peak list subjected to deletion, and the analyzing unit repeats the deletion and grouping to thereby make a plurality of groups.

8. The mass spectrum processing device according to claim 2, wherein the permissible range of the KMD of the starting point peak becomes larger, depending on a molecular weight.

9. The mass spectrum processing device according to claim 1, wherein the starting point peak is a monoisotopic peak, and the grouping unit makes larger the permissible range of the RKM as a molecular weight becomes larger.

10. The mass spectrum processing device according to claim 1, wherein the starting point peak is a peak having a maximum ionic strength among isotopic peaks of the sample, and the grouping unit makes the permissible range of the RKM larger as a molecular weight becomes larger.

11. The mass spectrum processing device according to claim 1, wherein the grouping unit determines whether the grouped peaks are peaks attributed to a polymer, referring to a lower limit of a number of grouped peaks.

12. A mass spectrum processing method, comprising the steps of:

executing peak determination with respect to a mass spectrum of a sample containing a synthetic polymer to generate a peak list;

calculating a Kendrick mass (KM) of a designated monomer for each of a plurality of peaks contained in the peak list to calculate an RKM, the RKM being a fractional part of a value obtained by dividing the KM by an integer mass of the monomer, or a remainder of dividing a nominal Kendrick mass (NKM) by the integer mass of the monomer; and grouping a plurality of peaks that are contained in the peak list and satisfy a grouping condition, the grouping condition including a permissible range of an RKM of a starting point peak.

13. The mass spectrum processing method according to claim 12, further comprising the steps of:

calculating a Kendrick mass defect (KMD) of the monomer for each of the plurality of peaks contained in the peak list, and grouping a plurality of peaks that are contained in the peak list and satisfy a grouping condition, the grouping condition including a permissible range of an KMD of the starting point peak and the permissible range of the RKM of the starting point peak.

* * * * *